United States Patent

Guillot et al.

[11] Patent Number: 5,986,255
[45] Date of Patent: Nov. 16, 1999

[54] PHOTOELECTRIC CELL WITH LOCKABLE DIFFERENTIAL PROCESSING

[75] Inventors: Alain Guillot, Fleac; Pierre Charrier, Migne-Auxances, both of France

[73] Assignee: Schneider Electric SA, Boulogne Billancourt, France

[21] Appl. No.: 08/986,638

[22] Filed: Dec. 8, 1997

[30] Foreign Application Priority Data

Jun. 12, 1996 [FR] France .................................. 96 15126

[51] Int. Cl.⁶ .................................................. H01J 40/14
[52] U.S. Cl. ................................ 250/214 R; 250/559.38
[58] Field of Search ........................... 250/214 R, 214 P, 250/214 A, 207.4, 207.6, 206.1, 559.38, 559.39; 356/3.06, 3.01, 3.1

[56] References Cited

U.S. PATENT DOCUMENTS

| | | | |
|---|---|---|---|
| 4,288,152 | 9/1981 | Matsuda | 250/201.6 |
| 4,849,781 | 7/1989 | Nakazawa et al. | 250/214 P |
| 5,157,435 | 10/1992 | Min et al. | 250/201.4 |

OTHER PUBLICATIONS

Patent Abstracts of Japan, vol. 11, No. 32, (P–541), Jan. 30, 1987 and JP 61 201223 A, Sept. 5, 1986.
Patent Abstracts of Japan, vol. 9, No. 334, (P–417), Dec. 27, 1985 and JP 60 157011 A, Aug. 17, 1985.
Patent Abstracts of Japan, vol. 11, No. 137, (P–572), May 2, 1987 and JP 61 277009 A, Dec. 8, 1986.
Patent Abstracts of Japan, vol. 9, No. 105, (P–354), May 9, 1985 and JP 59 228108 A, Dec. 21, 1984.

*Primary Examiner*—Que T. Le
*Attorney, Agent, or Firm*—Oblon, Spivak, McClelland, Maier & Neustadt, P.C.

[57] ABSTRACT

A photoelectric cell which detects a distance of an object, including: a first detection component configured to produce a first current which is a function of the distance of the object; a second detection component configured to produce a second current which is a function of the distance of the object; and, a processing circuit configured to shape a first voltage signal and a second voltage signal that correspond to the first current and second current, respectively. The processing circuit includes a main comparator configured to determine whether the distance of the object is greater or less than a detection range of said photoelectric cell by comparing the first voltage signal and the second voltage signal and to output a switching signal indicative of whether the distance of the object is greater or less than the detection range, and, a locking comparator configured to maintain the switching signal in an inactive state when the first voltage signal is less than a set-point voltage which corresponds to a detection distance greater than the detection range.

3 Claims, 1 Drawing Sheet

PHOTOELECTRIC CELL WITH LOCKABLE DIFFERENTIAL PROCESSING

BACKGROUND OF THE INVENTION

1. Field of the Invention

The present invention relates to a photoelectric cell, particularly one that excludes the background, using two either separate light-receiving components or two such components combined in a single device. The light-receiving components provide currents that vary differently depending on the distance of an object or target located in the path of the optical beam received by the components. The invention also uses an electronic circuit that carries out differential processing of the currents.

2. Discussion of the Background

Such cells, using for example a light-receiving device called a Position Sensitive Device (PSD), are well known in the art. They make use of the fact that, for a distance of the object greater than a nominal distance known as the detection range, the first current (provided by the first component) is greater than the second current (provided by the second component) whereas the opposite is the case at distances less than this range. Use is made of this phenomenon by means of an electronic circuit that transforms the currents into signals with different voltages and compares the voltage signals in a main comparator. This comparator provides an output signal that signifies the ON or OFF status of the cell; the cell then interprets the position of the object as being beyond or within the range.

It is found, however, that if the object is at infinite distance or very large the voltages representing the two currents are practically nil. This results in the comparator output being unstable under circumstances where interference is present.

SUMMARY OF THE INVENTION

It is the aim of the invention to make the cell immune to interference affecting the reception circuit when the object to be detected is absent or located at a distance greater than the detection range.

The present invention includes a locking comparator that compares the first voltage signal with a voltage set-point in order to output a signal that maintains the switching signal in the inactive state, representing the OFF status of the cell, for as long as the first signal is weaker than the set-point. This maintaining function is preferably ensured by locking the input of the main comparator into which the first voltage signal is fed.

The following description of an example of an embodiment of the invention refers to the attached drawings and will enable the reader to understand the characteristics of the invention and the results that can be obtained by using it.

DESCRIPTION OF THE PREFERRED EMBODIMENTS

Figure 1:
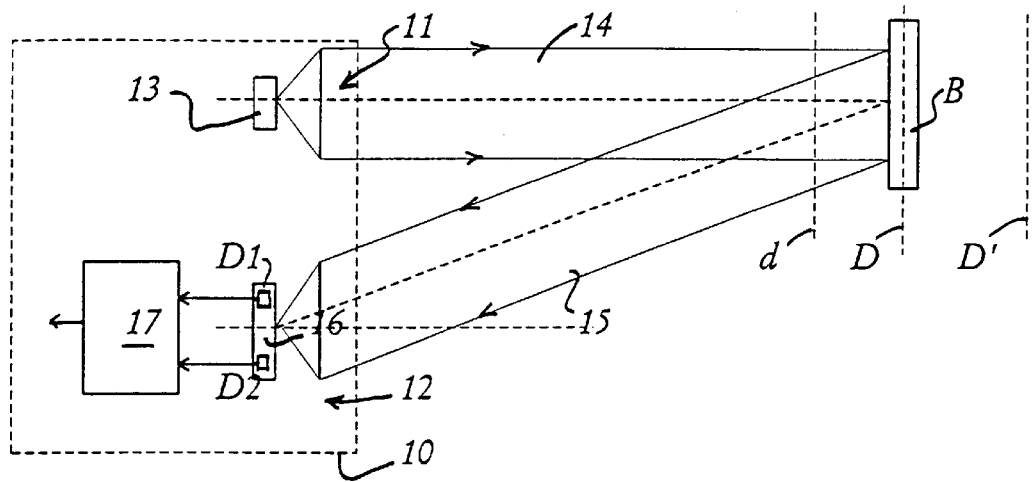
FIG. 1 is a schematic diagram of the operating principle of a background-excluding photoelectric cell.

The background-excluding photoelectric cell 10 shown in FIG. 1 comprises an emitting section 11 and a receiving section 12. The emitting section consists of a pulse-emitting electronic circuit (not shown) and a light-emitting device 13 that emits a pulsed optical beam 14. An object or target B returns part of the beam as a reflected beam 15 to a light-receiving apparatus 16 in receiving section 12. Apparatus 16 is a PSD component or similar comprising, for example, two diodes D1, D2 (see FIG. 2) offset so that the respective pulsed currents provided by the diodes vary differently depending on the distance d of the object B. Where D is the detection range of the cell, if d=D: I1=I2, if d>D: I1>I2 and if d<D: I1<I2. Currents I1 and I2 are differentially processed by an electronic circuit 17 in the receiving section 12 that delivers the switching signal S of the cell representing, for example, the OFF state (d>D) and the ON state (d<D).

Figure 2:
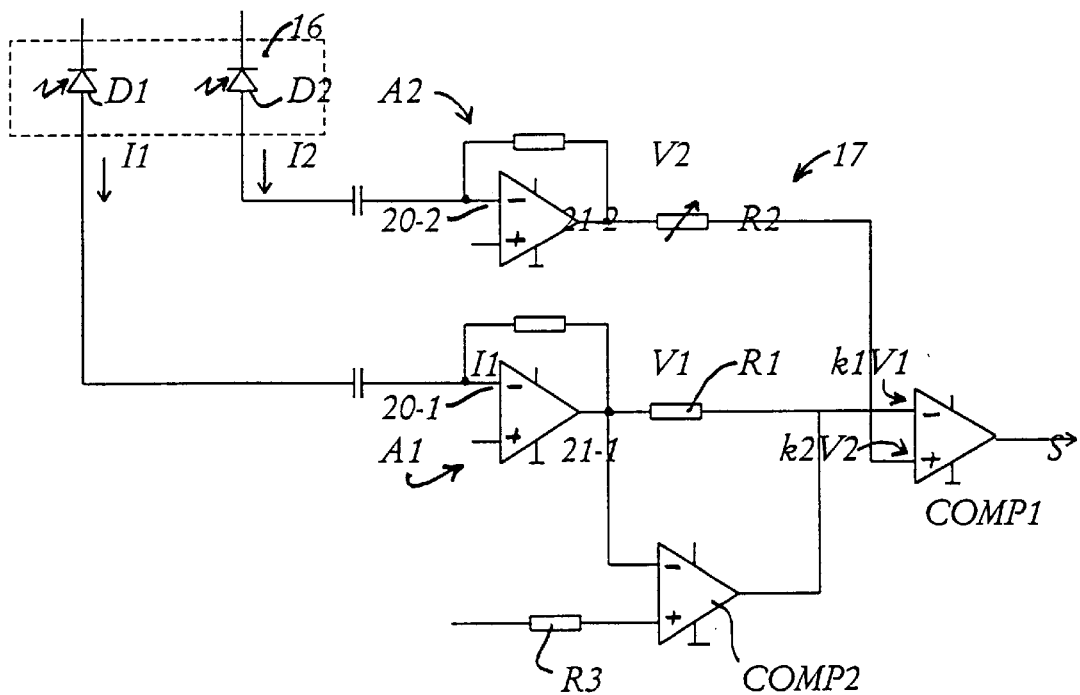
FIG. 2 is a diagram of part of the reception electronic circuit of the cell shown in FIG. 1.

As can be seen from FIG. 2, currents I1 and I2 supplied by D1 and D2 are conducted to reversing inputs 20-1, 20-2 of operational amplifiers A1 and A2 respectively. Amplifiers A1 and A2 supply signals of voltage V1, V2 at their respective outputs 21-1 and 21-2. Signals V1 and V2 are applied via resistor R1 and adjustable resistor R2 to the inputs of a comparator COMP1 whose output provides signal S that is a function of the comparison of V1 and V2 and whose 0 or 1 status indicates that the distance of the object is greater or less than D. Signal Vi is also applied to one input of a comparator COMP2 for comparison with a voltage set-point Vc that reflects a clearance distance D' greater than D. The output of comparator COMP2 is connected to the input of comparator COMP1 to which V1 is applied so that when the said output goes to the low state, e.g. 0 V, it forces the reversing input of comparator COMP1 whose output is then made immune to interference.

The cell described above operates as follows: when the object is located at a distance greater than D', e.g. a considerable distance away, voltage signals V1 and V2 are weak or very weak and close. Since V1<Vc the output of comparator COMP2 is at 0 V; the reversing input of comparator COMP1 is therefore forced to remain at 0 V and its output is stabilized in the OFF state. When the object approaches to a distance less than D' the output of comparator COMP2 goes to the high state and the state of the output of comparator COMP1 is then determined by the difference between V1 and V2: if D'>d>D the signal S is high (OFF state), whereas if d<D it is low (ON state). The interference present when d<D therefore does not disturb signal S due to the good signal to noise ratio thereby achieved.

We claim:

1. A photoelectric cell which detects a distance of an object in reference to a position of the photoelectric cell, comprising:

a first detection component configured to produce a first current which is a function of the distance of the object;

a second detection component configured to produce a second current which is a function of the distance of the object; and, a processing circuit configured to shape a first voltage signal and a second voltage signal that correspond to the first current and second current, respectively, said processing circuit comprising, a main comparator configured to determine whether the distance of the object is greater or less than a detection range of said photoelectric cell by comparing said first voltage signal and said second voltage signal and to output a switching signal indicative of whether the distance of the object is greater or less than the detection range, and, a locking comparator configured to maintain the switching signal in an inactive state when the first voltage signal is less than a set-point voltage which corresponds to a detection distance greater than the detection range.

2. The photoelectric cell of claim 1, wherein said locking comparator is configured to apply an output voltage to an input of the main comparator.

3. The photoelectric cell of claim 1, wherein said locking comparator is configured to apply an output voltage to a reversing input of the main comparator.

* * * * *

UNITED STATES PATENT AND TRADEMARK OFFICE
CERTIFICATE OF CORRECTION

PATENT NO. : 5,986,255
DATED : November 16, 1999
INVENTOR(S): Alain GUILLOT, et al It is certified that an error appears in the above-identified patent and that said Letters Patent is hereby corrected as shown below:

On the title page, item [30] is incorrect, should be:

-- [30]     Foreign Application Priority Data

Dec. 6, 1996    [FR]    France ............................... 96 15126

Signed and Sealed this

Eleventh Day of July, 2000

*Attest:*

Q. TODD DICKINSON

*Attesting Officer*          *Director of Patents and Trademarks*